(12) United States Patent
Dasari

(10) Patent No.: US 9,804,913 B2
(45) Date of Patent: Oct. 31, 2017

(54) MANAGEMENT OF A FAULT CONDITION IN A COMPUTING SYSTEM

(71) Applicant: Intel Corporation, Santa Clara, CA (US)

(72) Inventor: Annapurna Dasari, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 14/865,872

(22) Filed: Sep. 25, 2015

(65) Prior Publication Data

US 2017/0091007 A1   Mar. 30, 2017

(51) Int. Cl.
*G06F 11/00*   (2006.01)
*G06F 11/07*   (2006.01)

(52) U.S. Cl.
CPC ........ *G06F 11/079* (2013.01); *G06F 11/0709* (2013.01); *G06F 11/0751* (2013.01); *G06F 11/0772* (2013.01)

(58) Field of Classification Search
CPC .................................................. G06F 11/079
USPC .............................. 714/57, 2, 16, 25, 31, 48
See application file for complete search history.

(56) References Cited

U.S. PATENT DOCUMENTS

| | | | | |
|---|---|---|---|---|
| 5,664,093 | A * | 9/1997 | Barnett | G06F 11/142 706/45 |
| 7,681,075 | B2 * | 3/2010 | Havemose | G06F 11/1482 714/11 |
| 8,352,589 | B2 * | 1/2013 | Ridel | G06F 11/3495 707/600 |
| 8,731,724 | B2 * | 5/2014 | Drees | G05B 15/02 700/276 |
| 9,274,902 | B1 * | 3/2016 | Morley | G06F 11/2002 |
| 2005/0021622 | A1 | 1/2005 | Cullen | |
| 2012/0290497 | A1 | 11/2012 | Magara et al. | |

(Continued)

FOREIGN PATENT DOCUMENTS

EP   1863223 A1   12/2007

OTHER PUBLICATIONS

International Search Report and Written Opinion for International Application No. PCT/US2016/047951, mailed Dec. 22, 2016, 13 pages.

*Primary Examiner* — Dieu-Minh Le
(74) *Attorney, Agent, or Firm* — Jordan IP Law, LLC

(57) ABSTRACT

Systems, apparatuses, and/or methods may manage a fault condition in a computer system. An apparatus may dynamically publish a message over a publisher-subscriber system and dynamically subscribe to a message over the publisher-subscriber system, wherein at least one message may be used to address a fault condition in the computing system. The apparatus may predict a fault condition in a high performance computing (HPC) system, communicate fault information to a user, monitor health of the HPC system, respond to the fault condition in the HPC system, recover from the fault condition in the HPC system, maintain a rule for a fault management component, and/or communicate the fault information over the publisher-subscriber system in real-time. Messages may also be aggregated to minimize fault information traffic. The publisher-subscriber system may facilitate dynamic and/or real-time coordinated, integrated (e.g., system-wide), and/or scalable fault management.

21 Claims, 5 Drawing Sheets

(56) References Cited

U.S. PATENT DOCUMENTS

2015/0200877 A1 7/2015 Cuomo et al.
2015/0270014 A1 9/2015 Ellis

* cited by examiner

MANAGEMENT OF A FAULT CONDITION IN A COMPUTING SYSTEM

TECHNICAL FIELD

Embodiments generally relate to fault management. More particularly, embodiments relate to utilizing messages over a publication-subscription system to manage a fault condition in a high performance computing system.

BACKGROUND

Fault management in a computing system may be relatively complex. For example, information related to a particular failure may be relatively high since a large number of the sensors may provide sensor data for the same particular event. Thus, it may be relatively difficult to detect and/or manage a fault given computing system size and associated failure identification data emitted by sensors. Moreover, appropriate management communication paths may not be pre-determined. Also, pre-determined paths may become superfluous since a runtime context of a computing system may be unpredictable at the time of a failure. In addition, fault response and recovery may be insufficient.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
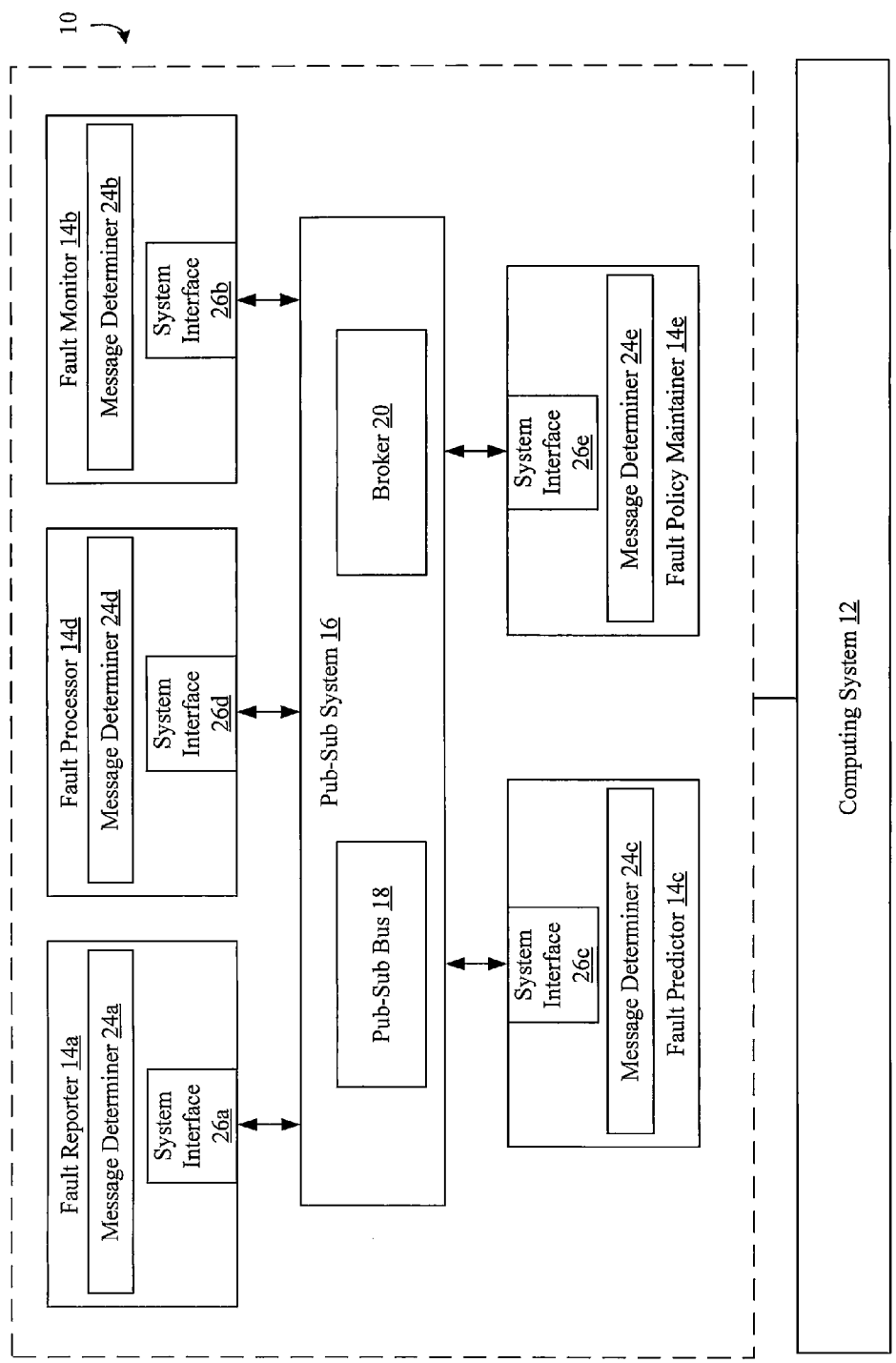
FIG. 1 is a block diagram of an example of a fault management system to manage a fault condition according to an embodiment.

FIG. 1 illustrates a fault management system 10 to manage a fault condition in a computing system 12. Fault information associated with the fault condition that may be of interest includes, for example, faults, possible faults, operating statistics, actions taken, actions to be taken, policy updates, reporting data, and so forth. As discussed in detail below, fault information may be dynamically shared among fault management components 14 (14a-14e) in real-time via messages that are published and that are subscribed to by interested fault management components to address the fault condition.

The illustrated computing system 12 may include a high performance computing (HPC) system. In this case, the fault condition may include a failure and/or a predicted failure of a field replacement unit (FRU) in the HPC system. The FRU may include a device such as a compute node (CN), an input/output node (ION), a server, a part thereof (e.g., a module, a fan, a power supply, a network interface, memory, etc.), and so forth. The FRU may also include a software component such as an application, an operating system, microcode, a file system, a part thereof (e.g., a plug-in, a driver, a function, a directory, etc.), and so forth. Moreover, the computing system 12 may include a sensor (e.g., a million sensors in an HPC system) to capture and to provide data corresponding to health of a respective hardware component and/or a respective software component being monitored.

The fault management components 14 (14a-14e) may exchange fault information over a publisher-subscriber (pub-sub) system 16. The fault management components 14 may include a fault reporter 14a to communicate fault information to a user, a fault monitor 14b to monitor health of the computing system 12, a fault predictor 14c to predict a fault condition in the computing system 12, a fault processor 14d to respond to and/or to recover from the fault condition in the computing system 12, and a fault policy maintainer 14e to maintain a rule for the fault management components 14. The fault management components 14 may include sub-components such as, for example, a fault responder of the fault processor 14d to respond to a fault condition, a fault recoverer of the fault processor 14d to recover from a fault condition, and so forth.

The illustrated fault reporter 14a may provide fault information to a user (e.g., a system administrator, an end user, etc.) including sensor data, prediction data, action data, policy data, and so forth. The fault reporter 14a may provide fault information via, for example, a graphical user interface (GUI), a command line interface, an electronic message interface, and so forth. The illustrated fault monitor 14b may monitor the health of a hardware component and/or a software component (e.g., FRUs) of the computing system 12. In one example, the fault monitor 14b may continuously read values of corresponding hardware sensors and/or corresponding software sensors at a particular rate and detect faults based on pre-defined criteria (e.g., threshold values, etc.).

The illustrated fault predictor 14c may utilize real-time sensor data from the fault monitor 14b to generate prediction data such as, for example, a prediction of a likelihood of a possible fault, a prediction of a time period of a possible fault, a prediction of a location of a possible fault, and so forth. In one example, the fault predictor 14c may apply a heuristic on the real-time sensor data to provide proactive detection of a likely fault before the fault occurs and to facilitate appropriate actions before the fault occurs. The illustrated fault processor 14d may provide a system-wide response to a fault that has occurred or is predicted to occur in the future by implementing reactionary and/or proactive actions that may be taken at various locations to address a fault condition.

The illustrated fault policy maintainer 14e may maintain rules for the fault management components 14. The rules may include, for example, monitoring policies (e.g., what to monitor, where to monitor, when to monitor, how to monitor, etc.), prediction policies (e.g., what to predict, where to predict, when to predict, how to predict, etc.), reporting policies (e.g., what detected faults to report, where detected faults are to be reported, when to report detected faults, how to report detected faults, etc.), response and recovery policies (e.g., what action to take to respond to or recover from a fault, where to take action, how to take action, when the take action, etc.). Any or all of the policies may be changed by a user based on a current state of the computing system 12 and/or fault information from the fault management system 10.

The illustrated fault management components 14 may be implemented as independent monolithic components. For example, the fault reporter 14a and/or the fault predictor 14c and may be independent components that run at specific locations and/or nodes (e.g., an aggregator node). In one example, the fault reporter 14a and/or the fault predictor 14c may run at a control system component (e.g., for an HPC system) such as a rack controller (RC), a row controller (RoC), a system management system (SMS) including a reliability-availability-serviceability (RAS) engine, a resource manager (RM), a fabric manager (FM), a runtime engine, and so forth. Thus, for example, the fault predictor 14a may include a single fault predictor located at a RM, located at a FM, and so forth. In another example, the fault reporter 14a and/or the fault predictor 14c may run at dedicated nodes outside of a control system and be coupled with the control system via the pub-sub system 16 or via a different pub-sub system.

The illustrated fault management components 14 may also be implemented as a collection of agents that run at different locations and/or that communicate with an aggregator node (e.g., of the same class). In one example, the fault monitor 14b and/or the fault processor 14d may run as distributed agents at multiple locations of the computing system 12 such as any or all sensors in an HPC system, any or all compute nodes in an HPC system, any or all I/O nodes in an HPC system, any or all operating systems in the HPC system, and so forth. In another example, the fault monitor 14b and/or the fault processor 14d may run as distributed agents at various control system components such as a RM, a FM, and so forth. Thus, for example, the fault processor 14b may run as distributed agents in a RM, in a FM, and so forth. In a further example, the fault monitor 14b may run as distributed agents at a lower level of a fault management system hierarchy and provide data to an aggregator at a higher level of the fault management system hierarchy.

The illustrated pub-sub system 16 includes a pub-sub bus 18 to disseminate messages among message producers and message subscribers. For example, message determiners 24 (24a-24e) may publish a message over the pub-sub bus 18 and/or may subscribe to a message over the pub-sub bus 18 via system interfaces 26 (26a-26e). In this regard, any or all of the message determiners 24 may forward messages and/or receive messages using asynchronous dynamic communication paths over the pub-sub bus 18. For example, a message producer/publisher may not know the identity of a message subscriber to publish a message and a message subscriber may not know the identity of a message producer/publisher to subscribe to a message since the pub-sub bus 18 allows the message publisher/producer to publish messages and the message subscriber to subscribe to messages independently of knowledge of one another. Thus, asynchronous dynamic communication paths may be established in real-time to exchange information that is of interest over the pub-sub bus 18. In one example, the pub-sub bus 18 may be deployed as a logical bus implemented using physical interfaces to provide physical communication links between various entities of the computing system 12.

In addition, the illustrated pub-sub system 16 includes a broker 20 (e.g., a central server) to provide a brokering service between the message producers and the message subscribers. For example, any or all of the message determiners 24 may communicate with the broker 20 to send messages over the pub-sub bus 18 that are forwarded to message subscribers by the broker 20 over the pub-sub bus 18. Any or all of the message determiners 24 may also communicate with the broker 20 to identify messages that are available over the pub-sub bus 18. For example, any or all of the message determiners 24 may communicate with the broker 20 to register with the broker over the pub-sub bus 18, and an interested message determiner may ask the broker 20 for the types of messages being generated/published to identify an event of interest and/or to determine specific messages of interest to subscribe to. The interested message determiner may then register a subscription with the broker 20, which may validate the subscription and forward subscriber contact information to the appropriate message producer/publisher to allow for the messages of interest to be forwarded directly to the interested message determiner (e.g., the message subscriber).

The interested message determiner may further generate/publish messages that may be of interest to other message determiners. For example, the messages generated/published by the interested message determiner may include a new message based on an action taken by the interested message determiner, a new message based on an evaluation of data in a received message, a message based on a management capability of a fault management component associated with the interested message determiner, and so forth. In this case, other message determiners may similarly dynamically subscribe to the messages in real-time (e.g., that are of interest) being generated/published by the interested message determiner and dynamically generate/publish messages to be communicated over the pub-sub bus 18.

Accordingly, any or all of the message determiners 24 may include publishing functionality and subscribing functionality to dynamically publish messages and to dynamically subscribe to messages to exchange fault information in real-time (e.g., fault monitor data and fault response data, etc.). In addition, any or all of the message determiners 24 may dynamically add message types and/or messages. For example, dynamically added messages may include a fault monitor message (e.g., including sensor data), a fault response message (e.g., including a fault response action), a fault recovery message (e.g., including a fault recovery action), a fault report message (e.g., including a fault condition), a fault policy message (e.g., including a rule or an update to a rule), a fault prediction message (e.g., including a predicted fault condition), and so forth.

The dynamic addition of message producers, message subscribers, messages, and/or message types may facilitate real-time and/or dynamic coordinated, integrated (e.g., system-wide), and/or scalable fault management. For example, a control system component may not function alone since message determiners may be aware, through dynamic sharing, of inputs to and outputs from other message determiners for coordinated and/or integrated fault condition response (e.g., via shared knowledge of a fault condition and recovery/corrective actions that may be taken anywhere in a computing system). In addition, scalability may be provided since fault monitors, fault predictors, fault processors, etc., may better manage faults at a component level by exchanging fault information in real-time to adapt and respond to a current state of a computing system.

Any or all of the message determiners 24 may also directly exchange information when, for example, an endpoint of a communication path and/or a substructure of the communication (e.g., content of messages needed to be exchanged) are pre-defined and/or known. For example, pre-defined communication paths (e.g., static communication) may include sending fault information from the fault monitor 14b to the fault reporter 14a, sending initial policies and/or configuration data from the fault policy maintainer 14e to the fault monitor 14b, and so forth. Notably, however, dynamically established communication paths via message exchanges over the pub-sub system 16 in real-time may accommodate fault management based on a runtime context of the computing system 12 at the time of a failure or a predicted failure.

While independent fault management components and/or particular communication flows have been shown, it should be understood that one or more of the fault management components may be combined, omitted, bypassed, re-arranged, etc., and/or that communication may flow in any configuration, order, and/or direction. In one example, the broker 20 may be omitted when the message determiners 24 directly exchange messages over the pub-sub bus 18. In another example, the fault monitor 14b may communicate over a static link with the fault reporter 14a to bypass the pub-sub system 16.

Figure 2:
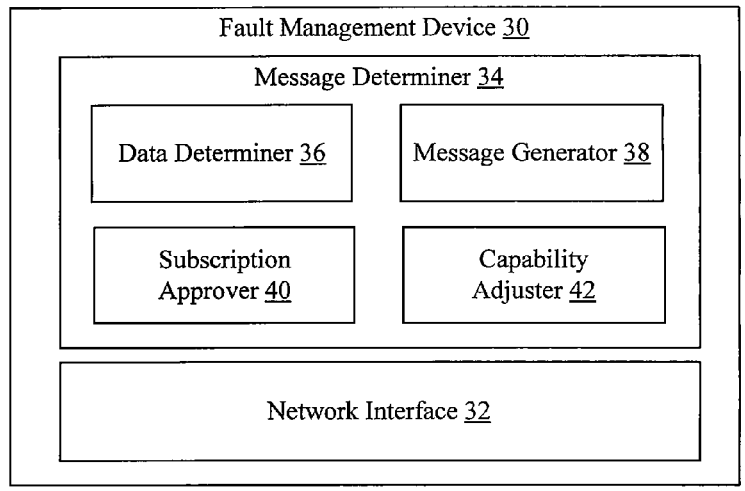
FIG. 2 is a block diagram of an example of a device to manage a fault condition according to an embodiment.

Turning now to FIG. 2, a fault management device 30 includes a network interface 32 to exchange messages over a data network coupled with a fault management system. The network interface 32 may include communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), 4G LTE (Fourth Generation Long Term Evolution), Bluetooth (e.g., Institute of Electrical and Electronics Engineers/IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), Near Field Communication, ECMA-340, ISO/IEC 18092), and other radio frequency (RF) purposes.

The device 30 also includes a message determiner 34 to dynamically publish a message and/or to dynamically subscribe to a message. Thus, the device 30 may be implemented in the fault management system 10 (FIG. 1), already discussed. The illustrated message determiner 34 includes a data determiner 36 to dynamically determine a need for data of interest to the message determiner 34. The data determiner 36 may, for example, communicate with a broker to identify a message (e.g., a message type) being published over a publisher-subscriber (pub-sub) system (e.g., a pub-sub bus). The data determiner 36 may also determine that specific fault information is of interest to the message determiner 34. For example, the data determiner 36 may consider a management capability of a fault management component associated with the message determiner 34 to determine the data of interest.

The message determiner 34 further includes a message generator 38 to generate/publish a request message that is to be provided to a broker and/or to another message determiner over the pub-sub system. The request message may include a request to subscribe to a message published by the other message determiner, wherein subscription may be validated before a message including the data or interest is forwarded to the message determiner 34. The request message may also include a description of the data of interest to the message determiner 34. For example, the message generator 38 may generate/publish a request message indicating a desire for particular fault information (e.g., for a particular fault or, more specifically, e.g., when a CN fails in one rack of an HPC system a desire for all fault information from that rack, etc.). In this case, for example, the request message that is published may be subscribed to by a fault monitor to provide sensor data (e.g., which may already be generated, published, etc.) that is of interest to the message determiner 34 when the sensor data is needed by a fault predictor associated with the message determiner 34.

The message generator 38 may also generate/publish a data message. In one example, the data message may include a fault policy message such as a policy update message identifying a rule (e.g., frequency of sensor monitoring) and/or a parameter of the rule (e.g., what sensors, how often to monitor, etc.). Accordingly, for example, a fault policy maintainer may subscribe to the policy update message and modify (e.g., update) policies of the message determiner 34 (e.g., increase in sensor monitoring). In this case, the fault policy maintainer may also generate/publish policy update messages for subscription by the other message determiners, which in turn may subscribe to the policy update messages to operate according to an altered management capabilities (e.g., to provide particular sensor data, data at a particular frequency, etc.). Thus, fault information may be published according to dynamically updated policies.

The data determiner 36 may also dynamically determine an ability to provide data of interest to other message determiners. For example, the data determiner 36 may receive a request message and determine an ability to provide the data of interest to interested message determiners based on a description of the data of interest in the request message, based on an update to a policy for the message determiner 34, and so forth. The data determiner may also determine an ability to provide data by evaluating a management capability of a fault management component associated with the message determiner 34. Moreover, the data determiner 36 may presume that the delivery of a request message to the message determiner 34 suffices to establish the ability to provide the data of interest, and may implement processes to verify the ability.

In addition, the message generator 38 may generate a data message that includes the data of interest to interested message determiners (e.g., subscribers), wherein the message determiner 34 may publish the data message over the pub-sub system to be provided to the interested message determiners that request specific fault information. It should be understood that the message generator 38 may generate/publish data messages independently of whether there are any interested message determiners (e.g., subscribers). In this regard, the message generator 38 may publish any data messages that the message generator 38 desires. The message generator 38 may generate/publish data messages that include information corresponding to all or a part of the management capabilities of a fault management component associated with the message determiner 34.

The message determiner 34 further includes a subscription approver 40. The subscription approver 40 may determine whether to permit subscription by other message determiners to a data message, which may include data of interest that is generated/published by the message generator 38. The subscription approver 40 may also permit subscription of the message determiner 34 to a request message that includes a description of data of interest to cause the message generator 38 to begin generating/publishing the data of interest to a particular interested message determiner.

In one example, the subscription approver 40 may ignore a request message to disallow access to a data message being published by the message generator 38 (e.g., may not generate data of interest, may prevent access to data of interest, etc.). In another example, the subscription approver 40 may refrain from subscribing to a request message to disallow access to the data message generated by the message generator 38. Thus, for example, a fault monitor may provide sensor data in a message that is published and is successfully subscribed to by a fault predictor, by a fault responder, by a third-party tool, etc., which may be interested in faults to take appropriate action (e.g., interested in a component and/or a job failing continuously to take action, etc.).

Additionally, subscribers that have dynamically subscribed to a data message may, in turn, dynamically add more parameters, seek for new kinds of faults, and/or ignore certain faults. For example, the message determiner 34 includes a capability adjuster 42 to determine whether to adjust a management capability of a fault management component associated with message determiner 34. In one example, the capability adjuster 42 may adjust a management capability based on a description of data of interest in a publication request message, in a policy message for the message determiner 34, and so forth. Thus, for example, the data determiner 36 may determine that a fault predictor needs to have particular fault data from a message that is subscribed to by the message determiner 34 (e.g., that adds parameters, that seeks particular data, etc.) and adjust, via the capability adjuster 42, a type of sensor data provided, a frequency of sensor data provided, a scope of sensor data provided, etc. Thus, a message producer/publisher may respond to a request and modify a message and/or attributes of a message being published.

While independent fault management device components have been shown, it should be understood that one or more of the fault management device components may be combined, omitted, bypassed, re-arranged, etc. In one example, the subscription approver 40 may be omitted when a broker approves subscription, when all messages may be subscribed to, and so forth. In another example, the data determiner 36, the subscription approver 40, and/or the capability adjuster 42 may be arranged in a fault management component outside of the message determiner 34.

Figure 3:
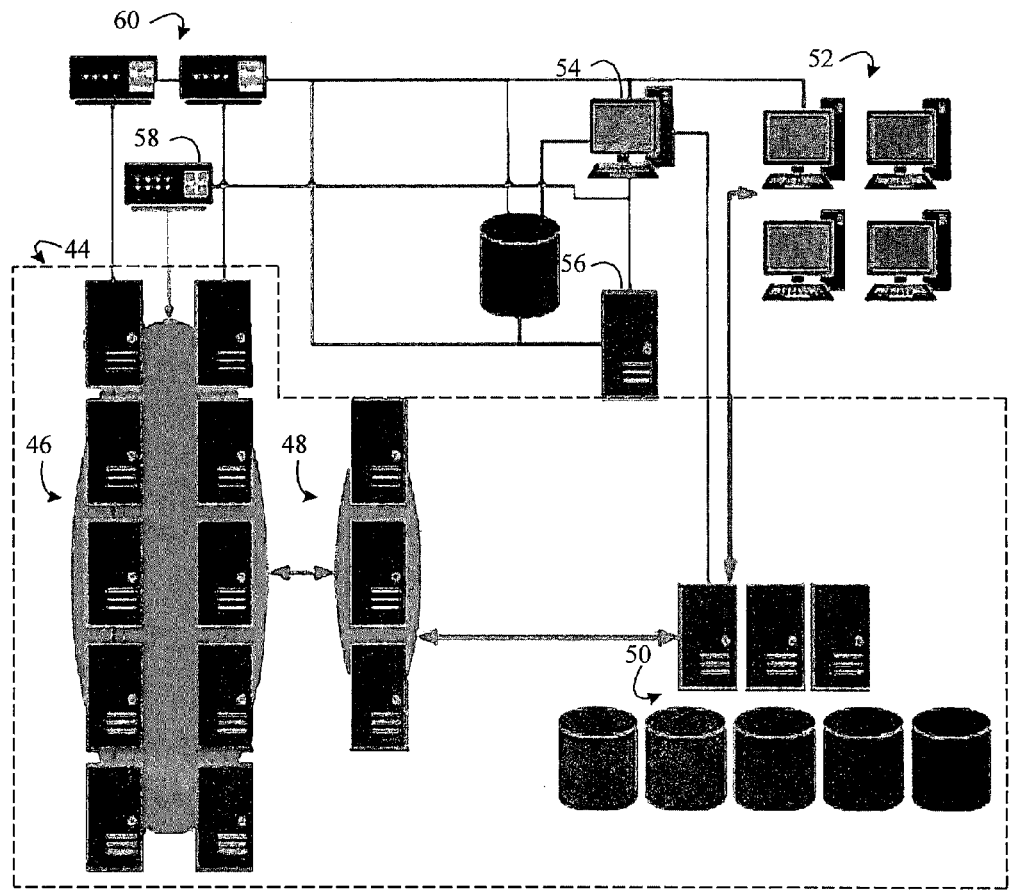
FIG. 3 is a block diagram of an example of a high performance computing system including a fault management system to manage a fault condition according to an embodiment.

FIG. 3 illustrates a high performance computing (HPC) system 44 including a fault management system that may be implemented at various field replaceable units (FRUs) and/or at various control system components. In the illustrated example, the FRUs include control nodes (CNs) 46 that may process jobs via input/output nodes (IONs) 48 with access to file structures (FSs) 50. The CNs 46 may communicate with each other through high speed interconnects (e.g., a fabric). In addition, the IONs 48 may be connected to the FSs 50 in parallel to allow a file system to be accessed in parallel. A user may interface with the HPC system 44 via login nodes 52 to run jobs.

The control system may manage HPC system resources, allocate resources to HPC jobs, schedule jobs, provide inventory collection, provide HPC runtime management, provide system health monitoring, provide network management, provide fabric management, provide system management, provide I/O management, provide storage system management, and so forth. Components of the control system may include software components that are each responsible for a task.

In one example, the components of the control system may include a system management system (SMS) 54 to provide fault information to a user, a resource manager (RM) 56 to schedule a job and/or to allocate resources to the job, a fabric manager (FM) 58 to manage a fabric used for communications between the CNs 46, rack controllers (RCs) 60 to monitor the CNs 46 in a respective lower level of a fault management system hierarchy, a row controller (not shown) to monitor the RCs 60, and so forth. The control system components may communicate with each other via the high speed interconnect of the HPC system 44, a dedicated low bandwidth management interconnect, and so forth.

Components of the fault management system may be implemented as a monolithic component, a collection of agents and aggregator, and so forth. In one example, a publication-subscriber (pub-sub) bus may run at a logical management level at one or more nodes of the HPC system 44 to provide a logical communication bus to message publishers and message subscribers. In another example, a broker may run at the SMS 54, at the RM 56, and/or any other desired location. In a further example, a fault reporter may run as a collection of agents at any or all sensors corresponding to the CNs 46, the IONs 48, the FSs 50, and so forth. Thus, for example, parts of fault monitoring functionality may occur at various levels of a fault management system hierarchy and at various locations of the control system and/or the HPC system 44.

An agent may run as an aggregator to collect data. For example, a fault monitor may run as an aggregator at the RCs 60 (e.g., aggregator node) to collect sensor data and/or messages from agents capturing sensor data and/or publishing messages corresponding to CNs 46 at a lower level of the fault management system hierarchy. Publishing and/or subscribing may, therefore, occur at a relatively higher level (e.g., at a top level, at each level, etc.) to minimize traffic. In addition, an aggregator may filter data. For example, agents may report a fault (e.g., fault monitoring messages) and an aggregator running, e.g., at the RCs 60 may filter out repetitive fault information to provide less traffic to a higher-level aggregator and/or to a fault management component at the same level or a higher level of the fault management hierarchy. Thus, the aggregator may minimize a number of messages published over a pub-sub system for a particular fault that may be relatively large (e.g., a thousand messages for one fault).

Moreover, higher-level publishing and/or higher-level subscribing may provide further targeted message delivery to interested fault management components. For example, an aggregator may filter messages and forward specific messages only to interested fault management components that specifically want the messages. In one example, an interested fault management component such as a fault processor running at the RM 56, a tool monitoring a job in the HPC system 44, etc., may indicate a desire to monitor data from a particular part of the HPC system 44, from a particular rack of a HPC system 44, and so forth. In this case, for example, the fault processor at the RM 56 and/or the third-party tool may publish a message that more information is needed, a desire to subscribe to all sensor data relevant to the job, and so forth. In response, subscribers of the published message may respond directly to the fault processor at the RM 56 and/or to aggregators. In addition, subscribers may tune sensors. For example, a fault policy maintainer running at the RCs 60 may subscribe to messages that are asking to update a policy, and in turn may generate policy update messages to cause sensors to be tuned to provide specific data of interest to interested fault management components.

In a further example, a fault processor may be implemented as a collection of agents that run at the RM 56, that run at the FM 58, etc., and may subscribe to fault monitor messages, fault response messages, and/or fault recovery messages to determine an appropriate action to take. In this case, for example, the fault processor running at the RM 56 may subscribe to fault monitor messages from a fault monitor running at the CNs 46 and to fault recovery messages from a fault processor running at the FM 58 to determine whether and/or how to re-allocate resources for a job. In addition, an aggregator running at the RCs 60 may provide the fault monitor messages and the fault recovery messages to the interested fault processor at the RM 56, which may have been filtered from all available messages received from a lower level of the fault management system hierarchy and/or provided as a targeted data delivery only to the interested fault processor at the RM 56.

Accordingly, communication over the pub-sub bus may allow information to be shared regarding faults that are occurring via published messages and may allow subscription to information about a particular fault that has happened and the action that has been taken in response. In this regard, a fault management component may need to know what faults have occurred and what responses have been taken for the faults to have a real-time context of a system state. For example, a fault processor running at the RM 56 may subscribe to fault processor messages from the FM 58 that may have responded to a fault condition by executing a re-computation of a network, wherein the RM 56 may like to know about the new state to allocate resources to job. Thus, response and/or recovery may be coordinated, such as the coordinated actions taken by the fault processors running at the RM 56 and the FM 58.

Additionally, response actions and/or recovery actions may be specific to a fault management component taking action (e.g., component-level action). In addition, some fault management components may be interested in particular information, and their actions may be different based on information subscribed to. In one example, an action taken to respond to and/or to recover from a fault condition may include re-allocating resources by a fault processor running at the RM 56, may include powering down a module by a fault processor running at the CNs 46, may include reverting to a prior version by a fault processor running at the FSs 50, and so forth. In another example, a fault monitor may be publishing fault information and subscribing to messages that request different types of fault monitor data and/or updates to fault monitoring policies.

The ability to respond to or recover from faults in parallel and/or across portions or all of the HPC system 44 (e.g., system-wide fault response and/or fault recovery) may allow fault conditions to be prevented and/or relatively quickly addressed. Response and/or recovery may also be integrated since, e.g., the RM 56 may no longer need to take action on its own. In this regard, an integrated solution may be provided to pass information for failures and actions taken or to be taken, wherein a part or all of the fault management components of the fault management system may be synchronized, redundant actions may be minimized, and/or system state may be consistent.

Additionally, any or all fault management components may request to subscribe to messages and a producer/publisher of the messages may decide if the messages can be given to the interested fault management component. Moreover, new subscribers may subscribe to new messages by iteratively implementing a discover process (e.g., discover message types, messages, etc.), in real-time. Also, any or all of the fault management components may subscribe to every message and decide what information to keep and what information to discard. For example, any or all fault management components may cancel a subscription, decide that they want more information and request similar messages, and so forth.

While particular fault management components have been discussed, it should be understood that one or more of the fault management components may be combined, omitted, bypassed, re-arranged, etc. In one example, the aggregator may be omitted when bandwidth is not a concern, when the fault management components wish to exchange all available information for all faults, for particular faults, for particular parts of the HPC system 44, for particular jobs, and so forth. In another example, a fault reporter may run at the SMS 54 to receive fault information, may provide information to a user via the login nodes 52, and so forth.

Figure 4:
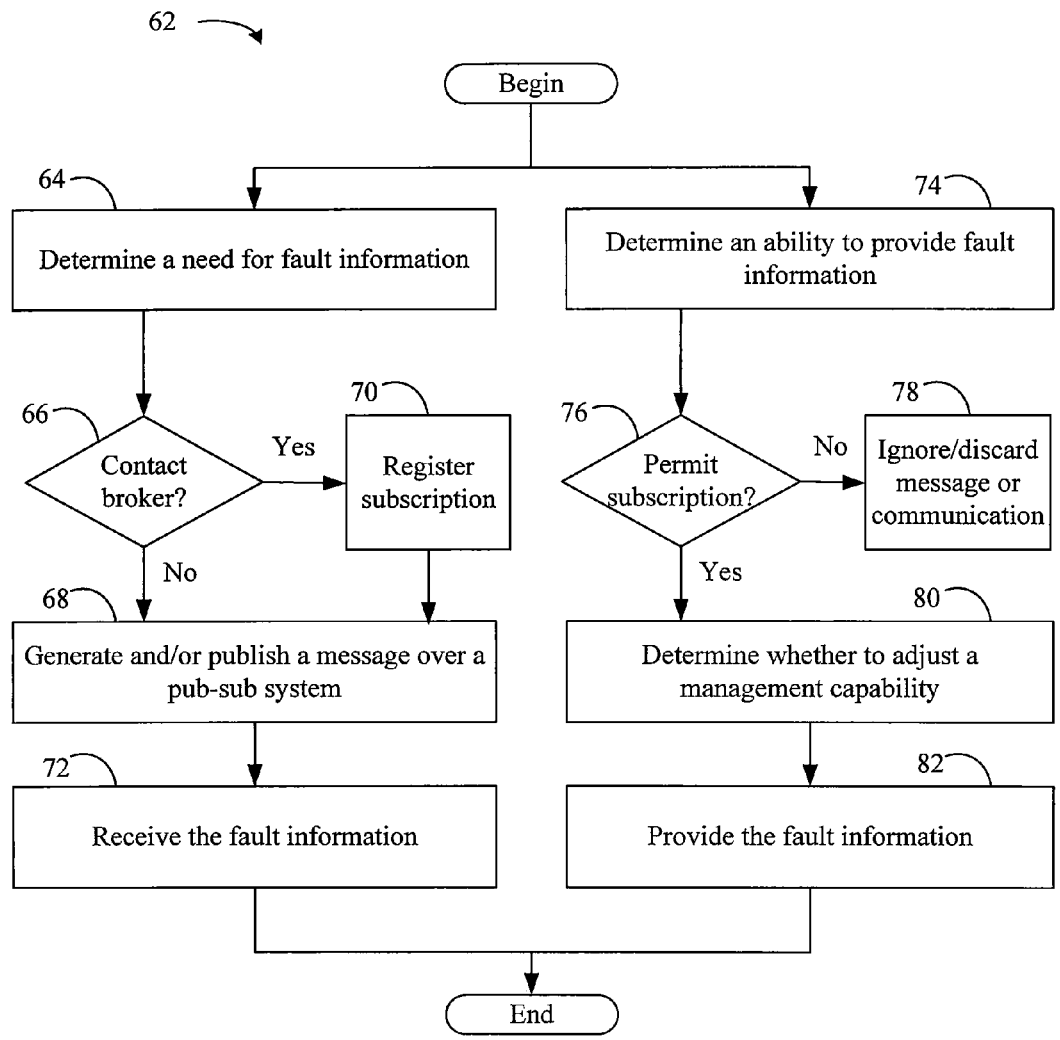
FIG. 4 is a flowchart of an example of a method to manage a fault condition according to an embodiment.

Turning now to FIG. 4, a method 62 is shown to manage a fault condition. The method 62 may be implemented by, for example, any or all fault management components 14 (FIG. 1), discussed above, the message determiner 30 (FIG. 2), discussed above, and/or any or all of the fault management components (FIG. 3), discussed above. The method 62 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 62 may be written in any combination of one or more programming languages, including an object oriented programming language such as JAVA, SMALLTALK, C++ or the like and conventional procedural programming languages, such as the "C" programming language or similar programming languages.

Illustrated processing block 64 provides for determining a need for fault information. The fault information may include data of interest such as a fault and/or a possible fault in a computing system that is of interest to a particular fault management component, an operating hardware and/or software characteristic in the computing system that is of interest to the particular fault management component, actions taken and/or to be taken to respond to and/or to recover from the fault and/or the possible fault by particular fault management components, reporting data provided and/or to be provided to a user by particular fault management components, sensor data from a particular part of the computing system that is of interest to the particular fault management component, sensor data for a particular job that is of interest to the particular fault management component, and so forth. In one example, the need for data may be in response to a trigger such as detection of a fault condition. In another example, data may include all data needed to operate a fault management component.

A determination may be made at processing block 66 whether to contact a broker. If not, illustrated processing block 68 provides for generating and/or publishing a message over the pub-sub system. Block 68 may directly identify messages (e.g., parse through messages, keyword comparisons, etc.) that include the data of interest and subscribe to the messages. If block 66 determines to contact the broker, illustrated processing block 70 provides for registering subscriptions with the broker. In one example, subscriptions may be validated before the data of interest is received.

Block 68 provides for generating and/or publishing a message over the pub-sub system. In one example, block 68 may publish a request message to request subscription to a message that includes the data of interest being published by a fault management component (e.g., a publisher). In another example, block 68 may publish a request message that prompts a fault management component (e.g., a publisher) to subscribe to the request message to cause the fault management component to provide the data of interest.

In one example, a fault management component that has an ability to provide the data of interest may subscribe to the request message (e.g., directly and/or through the broker) and issue a data message including fault information generated in response to the publication request message. Thus, illustrated processing block 72 provides for receiving the fault information from the fault management component, e.g., via the data message. In this regard, the fault information (e.g., via messages) may be collected at an aggregator, filtered, and provided as needed to block 72.

In addition, receipt of the fault information may cause fault management components to coordinate actions to address a fault condition. For example, a fault processor that is implemented as a collection of agents may coordinate actions to be taken at respective locations in a computing system and/or in a control system. In this case, a system-wide response may be facilitated, wherein actions that are taken may be specific to a computer system component in which each fault processor runs, a control system component in which each fault processor runs, the type of information subscribed to, and so forth. In one example, actions that are taken by a fault processor at a fabric manager may include re-configuring a switch fabric, actions that are taken by a fault processor at a resource manager may include locally re-allocating resources, actions taken by a fault processor at a file system may include reverting to a prior version of a database structure, and so forth. In another example, a fault policy maintainer may coordinate with a fault monitor to tune sensor data. In this case, for example, sensor data may be dynamically tailored for specific subscribers. In a further example, a fault predictor may coordinate with a fault processor to minimize downtime and/or maximize system productivity by detecting and/or resolving potential faults dynamically and more efficiently.

Illustrated processing block 74 may determine an ability to provide fault information. In one example, the determination may be in response to a trigger such as receipt of a request message, receipt of a policy update message, joining the pub-sub system, and so forth. In one example, block 74 may subscribe to a message and respond when the message subscribed to is received. The fault information may include data of interest to a fault management component such as a fault and/or a possible fault in a computing system, an operating hardware and/or software characteristic in the computing system, actions taken and/or to be taken to respond to and/or to recover from the fault and/or the possible fault, reporting data provided and/or to be provided to a user, sensor data from a particular part of the computing system, sensor data for a particular job, and so forth. Block 74 may, for example, determine a management capability of a fault management component associated with block 74 to determine the ability to provide fault information.

A determination may be made at processing block 76 whether to permit subscription. For example, block 76 may determine whether to permit subscription by a fault management component to a data message that includes the data of interest. If not, illustrated processing block 78 provides for discarding and/or ignoring the message from the fault management component and/or any other communication for unauthorized access to the data directly or indirectly from the fault management component. If so, illustrated processing block 80 determines whether to adjust a management capability. In one example, the management capability may be adjusted based on a description of data of interest in a request message. For example, a request message may include a description that indicates data from a sensor is needed more frequently, and block 80 may adjust the management capability of a sensor to capture data more frequently. Similarly, block 80 may receive a policy update message defining an update to the frequency of data capture and block 80 may adjust the management capability of the sensor based on the update.

Illustrated processing block 82 provides the fault information to the interested fault management component requesting the information. For example, block 82 may generate and/or publish a data message over the pub-sub system. In this regard, the fault information (e.g., via messages) may be collected at an aggregator, filtered, and provided as needed to the interested fault management component requesting the information. In addition, the data message may be registered at a broker to facilitate efficient discovery over the pub-sub system.

While independent methods, blocks, and/or a particular order has been shown, it should be understood that one or more of the blocks of the method 62 may be combined, omitted, bypassed, re-arranged, and/or flow in any order. In one example, illustrated blocks 64-72 and 74-82 may flow sequentially and/or in parallel. In another example, blocks 66, 70 may be bypassed when a broker is omitted. In a further example, blocks 64-72 and 74-82 may be implemented at the same or different fault management component, message determiner, and/or fault management device, insofar as each fault management component may include publication and subscription functionality.

Figure 5:
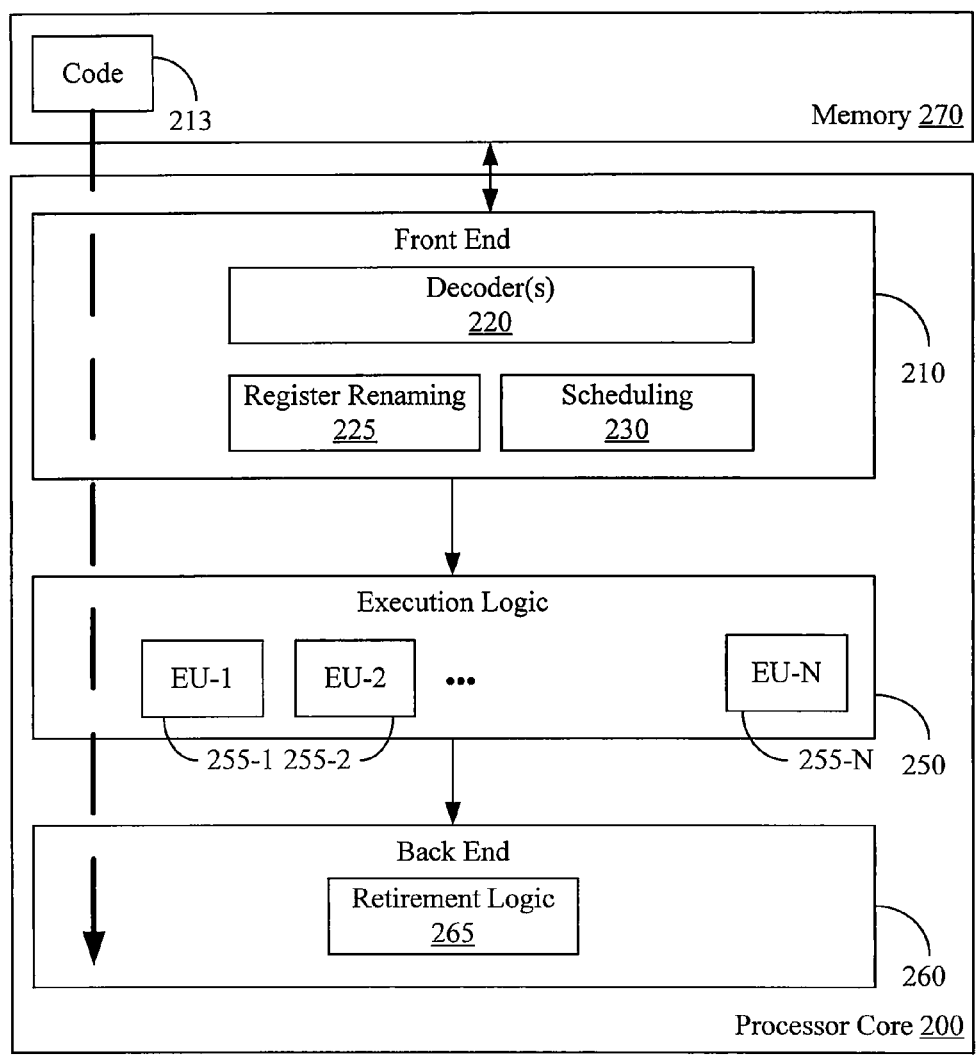
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 62 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
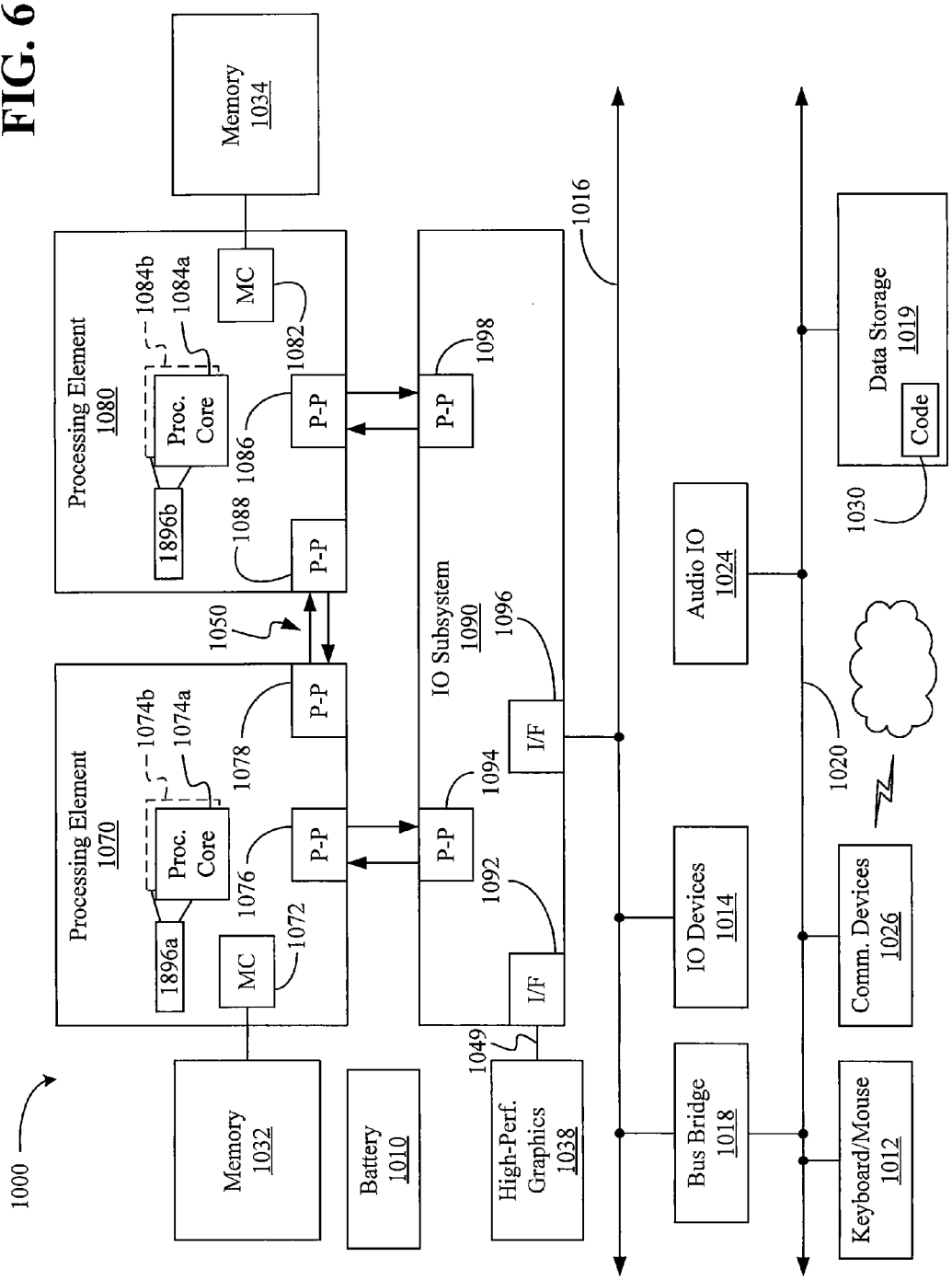
FIG. 6 is a block diagram of an example of a system according to an embodiment.

Referring now to FIG. 6, shown is a block diagram of a system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 62 (FIG. 4), already discussed, and may be similar to the code 213 (FIG. 5), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6. Moreover, the network controllers/communication device(s) 1026 may be implemented as a HFI (host fabric interface), also known as NIC (network interface card), that is integrated with one or more of the processing elements 1070, 1080 either on the same die, or in the same package.

Additional Notes and Examples

Example 1 may include a system manage a fault, comprising a sensor to collect data in a high performance computing (HPC) system and a plurality of message determiners, wherein each of the message determiners are to dynamically publish a message over a publisher-subscriber system and are to dynamically subscribe to a message over the publisher-subscriber system, and wherein at least one message is to correspond to the data from the sensor and is to be used to coordinate actions to manage a fault condition in the HPC system.

Example 2 may include the system of Example 1, further including a fault predictor to predict a fault condition in the HPC system, a fault reporter to communicate fault information to a user, a distributed fault monitor to monitor health of the HPC system, a distributed fault processor to one or more of respond to the fault condition in the HPC system or recover from the fault condition in the HPC system, a fault policy maintainer to maintain a rule for a fault management component, and a system interface to communicate the fault information over the publisher-subscriber system in real-time to one or more interested message determiners.

Example 3 may include the system of any one of Examples 1 to 2, wherein at least one of the message determiners is to receive information from a broker, and wherein the information is to include one or more of a data message including data of interest or subscriber contact information.

Example 4 may include the system of any one of Examples 1 to 3, wherein at least one of the message determiners is to provide a message to an aggregator at a higher level of a fault management system hierarchy, and wherein the aggregator is to collect messages from a lower level of the fault management system hierarchy and is to filter the messages to provide a sub-set at least of all available fault information to a higher level of the fault management system hierarchy.

Example 5 may include the system of any one of Examples 1 to 4, wherein a message determiner is to include a data determiner to dynamically determine a need for data of interest to the message determiner and a message generator to generate a request message to one or more of request subscription to a message that is to include the data of interest or prompt subscription to the request message to cause the data of interest to be published over the publication-subscription system.

Example 6 may include the system of any one of Examples 1 to 5, wherein a message determiner is to include a data determiner to dynamically determine an ability to provide data of interest to at least one other message determiner, a subscription approver to determine whether to permit subscription to provide a data message including the data of interest, a capability adjuster to determine whether to adjust a management capability of a fault management component associated with the message determiner based on one or more of a description of the data of interest or an updated policy for the message determiner, and a message generator to generate the data message to be published over the publication-subscription system.

Example 7 may include the system of any one of Examples 1 to 6, wherein at least one message is to include a fault monitor message, a fault response message, a fault recovery message, a fault report message, a fault policy message, or a fault prediction message.

Example 8 may include an apparatus to manage a fault condition, comprising a message determiner to dynamically publish a message over a publisher-subscriber system and to dynamically subscribe to a message over the publisher-subscriber system, wherein at least one message is to be used to coordinate actions to manage a fault condition in a computer system.

Example 9 may include the apparatus of Example 8, further including one or more of a fault predictor to predict a fault condition in a high performance computing (HPC) system, a fault reporter to communicate fault information to a user, a fault monitor to monitor health of the HPC system, a fault processor to one or more of respond to the fault condition in the HPC system or recover from the fault condition in the HPC system, a fault policy maintainer to maintain a rule for a fault management component, or a system interface to communicate the fault information over the publisher-subscriber system in real-time to one or more interested message determiners.

Example 10 may include the apparatus of any one of Examples 8 to 9, wherein the message determiner is to one or more of receive information from a broker, wherein the information is to include one or more of a data message including data of interest or subscriber contact information or provide a message to an aggregator at a higher level of a fault management system hierarchy.

Example 11 may include the apparatus of any one of Examples 8 to 10, further including one or more of a data determiner to dynamically determine a need for data of interest to the message determiner or a message generator to generate a request message to one or more of request subscription to a message including the data of interest or prompt subscription to the request message to cause the data of interest to be published over the publication-subscription system.

Example 12 may include the apparatus of any one of Examples 8 to 11, further including one or more of a data determiner to dynamically determine an ability to provide data of interest to at least one other message determiner, a subscription approver to determine whether to permit subscription to provide a data message including the data of interest, a capability adjuster to determine whether to adjust a management capability of a fault management component associated with the message determiner based on one or more of a description of the data of interest or an updated policy for the message determiner, or a message generator to generate the data message to be published over the publication-subscription system.

Example 13 may include the apparatus of any one of Examples 8 to 12, wherein at least one message is to include a fault monitor message, a fault response message, a fault recovery message, a fault report message, a fault policy message, or a fault prediction message.

Example 14 may include a method manage a fault condition, comprising dynamically publishing a message over a publisher-subscriber system by a message determiner and dynamically subscribing to a message over the publisher-subscriber system by the message determiner, wherein at least one message is used to coordinate actions to manage a fault condition in a computer system.

Example 15 may include the method of Example 14, further including one or more of predicting a fault condition in a high performance computing (HPC) system, communicating fault information to a user, monitoring health of the HPC system, one or more of responding to the fault condition in the HPC system or recovering from the fault condition in the HPC system, maintaining a rule for a fault management component; or communicating the fault information over the publisher-subscriber system in real-time to one or more message determiners.

Example 16 may include the method of any one of Examples 14 to 15, further including one or more of receiving information from a broker, wherein the information includes one or more of a data message including data of interest or subscriber contact information or providing a message to an aggregator at a higher level of a fault management system hierarchy.

Example 17 may include the method of any one of Examples 14 to 16, further including one or more of determining a need for data of interest to the message determiner or generating a request message to one or more of request subscription to a message including the data of interest or prompt subscription to the request message to cause the data of interest to be published over the publication-subscription system.

Example 18 may include the method of any one of Examples 14 to 17, further including one or more of determining an ability to provide data of interest to at least one other message determiner that has published a publication request message including a description of the data of interest, determining whether to permit subscription to provide a data message including the data of interest, determining whether to adjust a management capability of a fault management component associated with the message determiner based on one or more of a description of the data of interest or an updated policy for the message determiner, or generating the data message to be published over the publication-subscription system.

Example 19 may include the method of any one of Examples 14 to 18, wherein at least one message is to include a fault monitor message, a fault response message, a fault report message, a fault policy message, or a fault prediction message.

Example 20 may include at least one computer readable storage medium comprising a set of instructions which, when executed by a device, cause the device to dynamically publish a message over a publisher-subscriber by a message determiner and dynamically subscribe to a message over the publisher-subscriber system by the message determiner, wherein at least one message is to be used to coordinate actions to manage a fault condition in a computer system.

Example 21 may include the at least one computer readable storage medium of Example 20, wherein the instructions, when executed, cause a device to one more of predict a fault condition in a high performance computing (HPC) system, communicate fault information to a user, monitor health of the HPC system, one or more of respond to the fault condition in the HPC system or recover from the fault condition in the HPC system, maintain a rule for a fault management component, or communicate the fault information over the publisher-subscriber system in real-time to one or more message determiners.

Example 22 may include the at least one computer readable storage medium of any one of Examples 20 to 21, wherein the instructions, when executed, cause a device to one more of receive information from a broker, wherein the information is to include one or more of a data message including data of interest or subscriber contact information or provide a message to an aggregator at a higher level of a fault management system hierarchy.

Example 23 may include the at least one computer readable storage medium of any one of Examples 20 to 22, wherein the instructions, when executed, cause a device to one more of determine a need for data of interest to the message determiner or generate a request message to one or more of request subscription to a message including the data of interest or prompt subscription to the request message to cause the data of interest to be published over the publication-subscription system.

Example 24 may include the at least one computer readable storage medium of any one of Examples 20 to 23, wherein the instructions, when executed, cause a device to one more of determine an ability to provide data of interest to at least one other message determiner, determine whether to permit subscription to provide a data message including data of interest, determine whether to adjust a management capability of a fault management component that is to be associated with the message determiner based on one or more of a description of the data of interest or an updated policy for the message determiner, or generate the data message to be published over the publication-subscription system.

Example 25 may include the at least one computer readable storage medium of any one of Examples 20 to 24, wherein at least one message is to include a fault monitor message, a fault response message, a fault report message, a fault policy message, or a fault prediction message.

Example 26 may include an apparatus to manage a fault condition, comprising means for performing the method of any one of Examples 14 to 19.

Thus, techniques described herein may provide scalable fault management in an HPC system, real-time fault reporting and fault response communication, and integrated fault response. For example, both fault information and response action fro all fault management components may be communicated in real-time for an entire fault management system to adapt and/or manage the HPC system in a given context. In one example, a publication-subscriber bus as a two-way dynamic communication system to exchange fault information (e.g., fault and response actions) in real-time to provide fully coordinated, scalable, and/or real-time management actions using the pub-sub bus system. The pub-sub bus system may allow for dynamic (e.g., on-the-fly) addition of messages (and message types), producers/publishers, and consumers/subscribers. Thus, fault management components may better adapt and respond to a current system state by exchanging fault detection and response information.

In one example, a fault predictor may predict an occurrence of a fault and publish that information in real-time. Interested consumers, such as fault responders, fault policy maintainers, etc., may subscribe to that information and adaptively manage the HPC system. Communication messages and/or communication paths that cannot be pre-defined (e.g., contextual communications) due to changes in runtime context at a time of failure may be provided by creating and publishing new message types and allowing interested subscribers to discover and obtain content dynamically as needed. Moreover, scalability may be provided by facilitating transient on demand communication only to interested entities. Thus, a real-time pub-sub system may be leveraged to enable communication of transient, dynamic, and/or contextual messages for fault management. In addition, fault detection, fault prediction, and/or response actions may be exchanged continuously to maximize fault management in a large scale HPC system.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A system comprising:
a sensor to collect data in a high performance computing (HPC) system; and
a plurality of message determiners, wherein each of the message determiners are to dynamically publish a message over a publisher-subscriber system and are to dynamically subscribe to a message over the publisher-subscriber system, wherein at least one message is to correspond to the data from the sensor and is to be used to coordinate actions to manage a fault condition in the HPC system, and wherein a message determiner is to include:
a data determiner to dynamically determine a need for data of interest to the message determiner; and
a message generator to generate a request message to one or more of request subscription to a message that is to include the data of interest or prompt subscription to the request message to cause the data of interest to be published over the publication-subscription system.

2. The system of claim 1, further including:
a fault predictor to predict a fault condition in the HPC system;
a fault reporter to communicate fault information to a user;
a distributed fault monitor to monitor health of the HPC system;
a distributed fault processor to one or more of respond to the fault condition in the HPC system or recover from the fault condition in the HPC system;
a fault policy maintainer to maintain a rule for a fault management component; and
a system interface to communicate the fault information over the publisher-subscriber system in real-time to one or more interested message determiners.

3. The system of claim 1, wherein at least one of the message determiners is to receive information from a broker, and wherein the information is to include one or more of a data message including data of interest or subscriber contact information.

4. The system of claim 1, wherein at least one of the message determiners is to provide a message to an aggregator at a higher level of a fault management system hierarchy, and wherein the aggregator is to collect messages from a lower level of the fault management system hierarchy and is to filter the messages to provide a sub-set at least of all available fault information to a higher level of the fault management system hierarchy.

5. The system of claim 1, wherein a message determiner is to include:
a data determiner to dynamically determine an ability to provide data of interest to at least one other message determiner;
a subscription approver to determine whether to permit subscription to provide a data message including the data of interest;
a capability adjuster to determine whether to adjust a management capability of a fault management component associated with the message determiner based on one or more of a description of the data of interest or an updated policy for the message determiner; and
a message generator to generate the data message to be published over the publication-subscription system.

6. The system of claim 1, wherein at least one message is to include a fault monitor message, a fault response message, a fault recovery message, a fault report message, a fault policy message, or a fault prediction message.

7. An apparatus comprising:
a message determiner to dynamically publish a message over a publisher-subscriber system and to dynamically subscribe to a message over the publisher-subscriber system, wherein at least one message is to be used to coordinate actions to manage a fault condition in a computer system, and wherein the message determiner is to include:
  a data determiner to dynamically determine a need for data of interest to the message determiner; and
  a message generator to generate a request message to one or more of request subscription to a message that is to include the data of interest or prompt subscription to the request message to cause the data of interest to be published over the publication-subscription system.

8. The apparatus of claim 7, further including one or more of:
  a fault predictor to predict a fault condition in a high performance computing (HPC) system;
  a fault reporter to communicate fault information to a user;
  a fault monitor to monitor health of the HPC system;
  a fault processor to one or more of respond to the fault condition in the HPC system or recover from the fault condition in the HPC system;
  a fault policy maintainer to maintain a rule for a fault management component; or
  a system interface to communicate the fault information over the publisher-subscriber system in real-time to one or more interested message determiners.

9. The apparatus of claim 7, wherein the message determiner is to one or more of:
  receive information from a broker, wherein the information is to include one or more of a data message including data of interest or subscriber contact information; or
  provide a message to an aggregator at a higher level of a fault management system hierarchy.

10. The apparatus of claim 7, further including one or more of:
  a data determiner to dynamically determine an ability to provide data of interest to at least one other message determiner;
  a subscription approver to determine whether to permit subscription to provide a data message including the data of interest;
  a capability adjuster to determine whether to adjust a management capability of a fault management component associated with the message determiner based on one or more of a description of the data of interest or an updated policy for the message determiner; or
  a message generator to generate the data message to be published over the publication-subscription system.

11. The apparatus of claim 7, wherein at least one message is to include a fault monitor message, a fault response message, a fault recovery message, a fault report message, a fault policy message, or a fault prediction message.

12. A method comprising:
  dynamically publishing a message over a publisher-subscriber system by a message determiner;
  dynamically subscribing to a message over the publisher-subscriber system by the message determiner, wherein at least one message is used to coordinate actions to manage a fault condition in a computer system, the method further including:
    determining a need for data of interest to the message determiner; and
    generating a request message to one or more of request subscription to a message including the data of interest or prompt subscription to the request message to cause the data of interest to be published over the publication-subscription system.

13. The method of claim 12, further including one or more of:
  predicting a fault condition in a high performance computing (HPC) system;
  communicating fault information to a user;
  monitoring health of the HPC system;
  one or more of responding to the fault condition in the HPC system or recovering from the fault condition in the HPC system;
  maintaining a rule for a fault management component; or
  communicating the fault information over the publisher-subscriber system in real-time to one or more message determiners.

14. The method of claim 12, further including one or more of:
  receiving information from a broker, wherein the information includes one or more of a data message including data of interest or subscriber contact information; or
  providing a message to an aggregator at a higher level of a fault management system hierarchy.

15. The method of claim 12, further including one or more of:
  determining an ability to provide data of interest to at least one other message determiner that has published a publication request message including a description of the data of interest;
  determining whether to permit subscription to provide a data message including the data of interest;
  determining whether to adjust a management capability of a fault management component associated with the message determiner based on one or more of a description of the data of interest or an updated policy for the message determiner; or
  generating the data message to be published over the publication-subscription system.

16. The method of claim 12, wherein at least one message is to include a fault monitor message, a fault response message, a fault report message, a fault policy message, or a fault prediction message.

17. At least one non-transitory computer readable storage medium comprising a set of instructions which, when executed by a device, cause the device to:
  dynamically publish a message over a publisher-subscriber by a message determiner; and
  dynamically subscribe to a message over the publisher-subscriber system by the message determiner, wherein at least one message is to be used to coordinate actions to manage a fault condition in a computer system, and wherein the instructions, when executed, cause a device to:
    determine a need for data of interest to the message determiner; and
    generate a request message to one or more of request subscription to a message including the data of interest or prompt subscription to the request message to cause the data of interest to be published over the publication-subscription system.

18. The at least one computer readable storage medium of claim 17, wherein the instructions, when executed, cause a device to one or more of:

predict a fault condition in a high performance computing (HPC) system;
communicate fault information to a user;
monitor health of the HPC system;
one or more of respond to the fault condition in the HPC system or recover from the fault condition in the HPC system;
maintain a rule for a fault management component; or
communicate the fault information over the publisher-subscriber system in real-time to one or more message determiners.

19. The at least one computer readable storage medium of claim 17, wherein the instructions, when executed, cause a device to one or more of:
receive information from a broker, wherein the information is to include one or more of a data message including data of interest or subscriber contact information; or
provide a message to an aggregator at a higher level of a fault management system hierarchy.

20. The at least one computer readable storage medium of claim 17, wherein the instructions, when executed, cause a device to one or more of:
determine an ability to provide data of interest to at least one other message determiner;
determine whether to permit subscription to provide a data message including data of interest;
determine whether to adjust a management capability of a fault management component that is to be associated with the message determiner based on one or more of a description of the data of interest or an updated policy for the message determiner; or
generate the data message to be published over the publication-subscription system.

21. The at least one computer readable storage medium of claim 17, wherein at least one message is to include a fault monitor message, a fault response message, a fault report message, a fault policy message, or a fault prediction message.

* * * * *